Feb. 7, 1956          A. D. STIDHAM          2,733,932
TRAILER STEERING APPARATUS
Filed May 26, 1952                              3 Sheets-Sheet 1
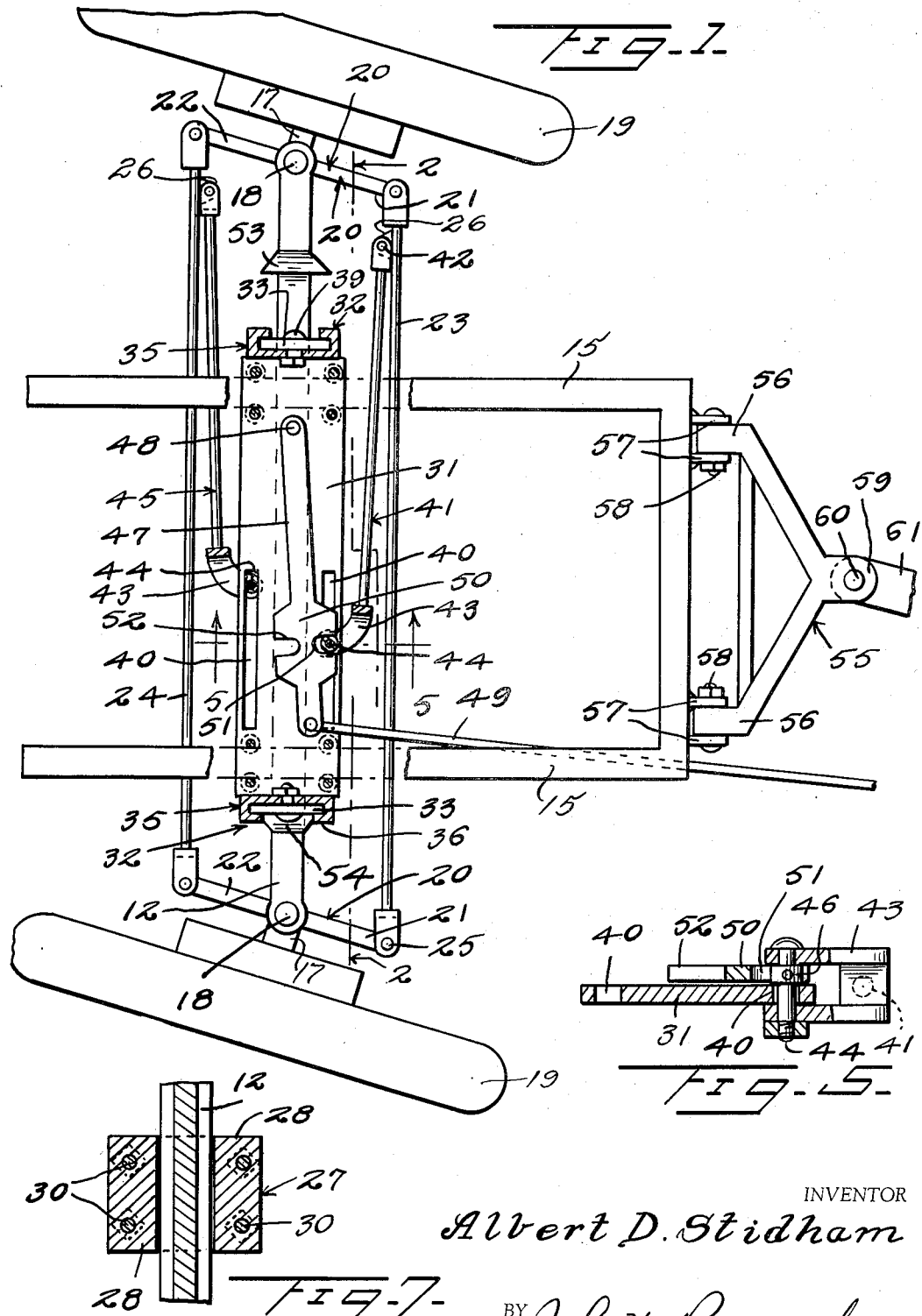
INVENTOR
Albert D. Stidham
BY John H. Randolph
ATTORNEY

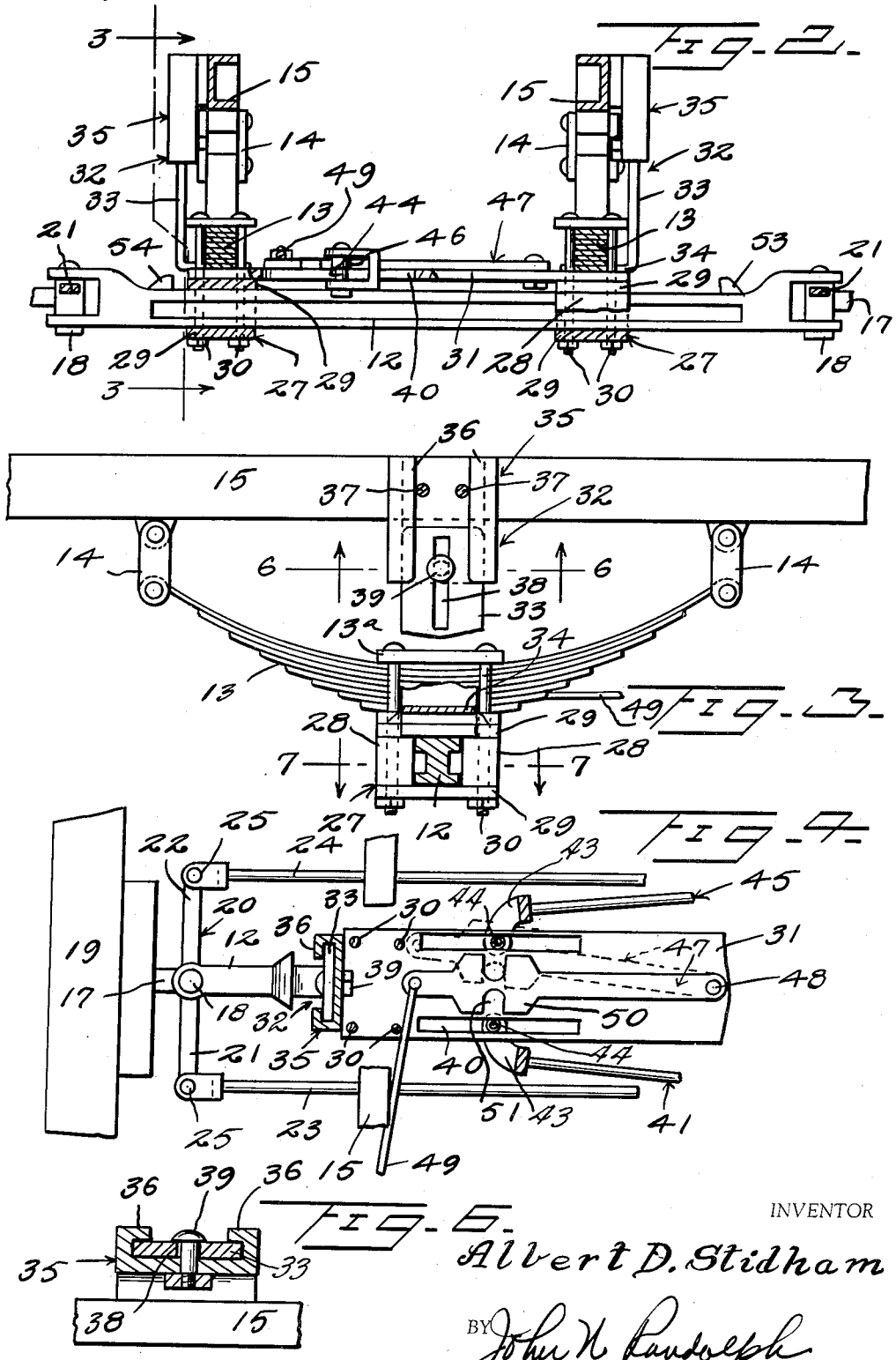

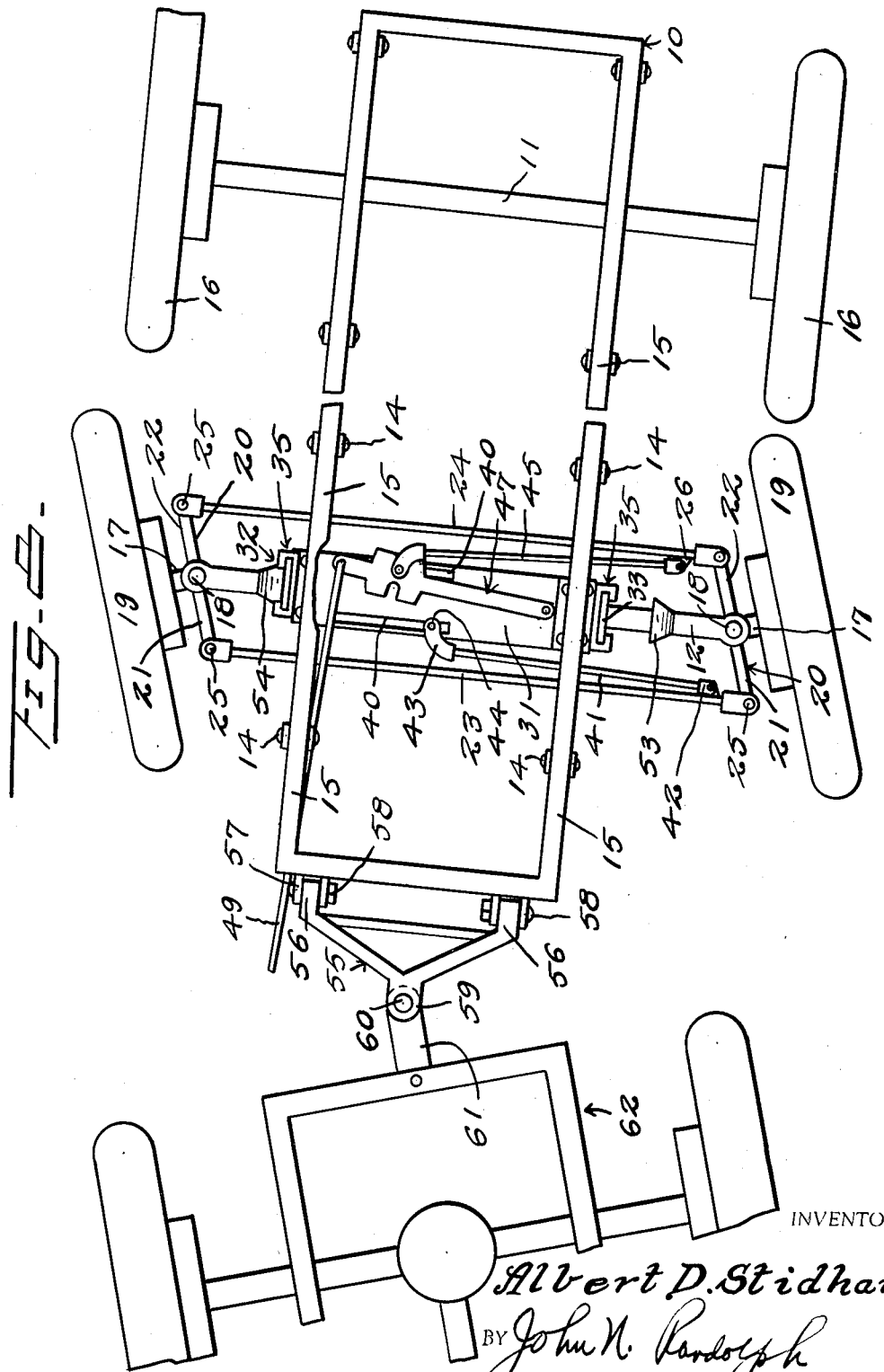

United States Patent Office 2,733,932
Patented Feb. 7, 1956

2,733,932

TRAILER STEERING APPARATUS

Albert D. Stidham, Chandler, Ariz.

Application May 26, 1952, Serial No. 289,956

5 Claims. (Cl. 280—103)

This invention relates to a novel apparatus or unit for use with tandem wheeled trailers to enable the trailer to be accurately steered to follow its draft vehicle and whereby the steerable wheels of the trailer are caused to turn to follow movements of the trailer frame which in turn is caused to move relatively to the steerable wheels by its connection to the draft vehicle.

More particularly, it is an aim of the present invention to provide a trailer steering unit wherein the frame is slidably supported on the axle of the steering wheels and whereby sliding movement of the frame relatively to said axle accomplishes a steering of the wheels for proper movement of the trailer relatively to its draft vehicle.

Still a further object of the invention is to provide a steering unit which may be readily adjusted for proper actuation of the steering wheels of the trailer when the trailer is either being moved forwardly or backwardly and whereby backing of a trailer is greatly facilitated.

Various other objects and advantages of the invention will hereinafter become more fully apparent from the following description of the drawings, illustrating a presently preferred embodiment thereof, and wherein:

Figure 1 is a fragmentary top plan view, partly in horizontal section, showing a portion of the front end of a trailer equipped with the steering unit;

Figure 2 is a longitudinal sectional view of the steering unit taken substantially along a plane as indicated by the line 2—2 of Figure 1;

Figure 3 is a cross sectional view of the invention taken substantially along a plane as indicated by the line 3—3 of Figure 2;

Figure 4 is a fragmentary plan view, partly in horizontal section similar to Figure 1 and illustrating a different position of the parts;

Figure 5 is a cross sectional view taken substantially along a plane as indicated by the line 5—5 of Figure 1;

Figures 6 and 7 are horizontal sectional views taken substantially along planes as indicated by the lines 6—6 and 7—7, respectively, of Figure 3, and Figure 8 is a fragmentary plan view of a trailer vehicle and the rear portion of a draft vehicle showing the steering unit positioned for steering the trailer vehicle during a backing movement thereof.

Referring more specifically to the drawings, the undercarriage of a trailer is illustrated in Figure 8 including a chassis frame 10 supported at one end thereof by springs, not shown, on an axle 11 and which is supported adjacent its opposite end on an axle 12 by means of a pair of conventional leaf springs 13 which are connected in a conventional manner, as illustrated at 14, to the longitudinal side beams 15 of the chassis frame 10. A corresponding pair of leaf springs, not shown, support the first mentioned chassis frame end above the axle 11. A pair of ground engaging wheels 16 are journalled on the ends of the axle 11. The axle 12 has spindles 17 swingably connected to the ends thereof by pivot pins or swivel joints 18 for mounting the spindles 17 for swinging movement in horizontal planes about vertical axes. A steerable surface engaging wheel 19 is journalled on the outer end of each spindle 17.

A crossarm 20 is fixed to the inner end of each spindle 17 at its swivel joint 18 and is disposed at a right angle to the spindle and parallel to the adjacent wheel 19. Each crossarm 20 includes a forwardly extending arm or part 21 and a rearwardly extending arm or part 22. The two front arm portions 21 are connected at their distal ends by a front steering arm connecting rod 23 and the two rear arm portions 22 are connected by a rear steering arm connecting rod 24. The connecting rods 23 and 24 are pivotally connected at their ends to the distal ends of the arm portions 21 and 22 by a conventional pivot joint 25. The connecting rods 23 and 24 adjacent corresponding ends thereof are provided with ears 26 which project toward one another.

A pair of corresponding boxes, designated generally 27, are mounted slidably on the front axle 12, one beneath each beam 15, said boxes 27 each including spacing elements 28 for spacing top and bottom plates 29 of each box and through which fastenings 30 extend for connecting the spacing elements 28 and plates 29. The spacing elements 28 provide a loose engagement of the boxes around the axles 12 to permit sliding movement of the boxes thereon. The boxes 27 are connected by a plate 31 which is disposed above the axle 12 and longitudinally thereof and the ends of which rest on the top plates 29 of the boxes 27 and are secured thereto by the fastenings 30 which extend through the ends of the plate 31.

Each beam 15 is connected to the box 27 disposed directly therebeneath by a standard 32, formed of telescopic sections including a bottom section 33 having an inturned lower end portion 34 which rests on an end of the plate 31. The springs 13 have intermediate portions resting on the inturned standard ends 34 and the bolts of the fastenings 30 extend up through a clamping plate 13a which rests upon each spring 13, intermediate of its ends for securing the intermediate portions of the springs to the standard portions 34, the ends of the plate 31 and the boxes 27. The bolts of the fastenings 30 straddle the inturned standard portions 34 and the intermediate portions of the springs 13. Each standard 32 includes an upper section 35 which is channel shaped in cross section, as illustrated in Figure 6, to receive the upper part of its related standard section 33 and which has inturned flanges 36 overlying the side edges of the channel and the side edges of the standard section 33. The upper portion of each standard section 35 is secured by fastenings 37 to the outer side of one of the beams 15. The lower standard sections 33 are provided with elongated vertically extending slots 38 to receive the bolts of nut and bolt fastenings 39 which extend through the slots 38 and are secured to the lower portions of the upper standard sections 35. The fastenings 39 loosely engage the slots 38 to permit telescopic sliding movement of the sections 33 and 35 relatively to one another. The frame beams 15 are supported by the springs 13 and the telescopic standards 32 function to prevent lateral movement of the beams 15 of chassis frame 10 relatively to the boxes 27.

The plate 31 is provided adjacent its longitudinal edges with corresponding elongated slots 40 which are located near the end of the plate 31 which is remote to the ears 26. A front drag link 41 is pivotally connected at one end thereof at 42 to the ear 26 of the front connecting rod 23 and has a bifurcated inturned opposite end 43 which straddles the slotted forward edge portion of the plate 31 and which has a pivot pin 44 extending through the furcations thereof and loosely through the front slot 40. A corresponding rear drag link 45 is pivotally connected to the ear 26 of the rear connecting rod 24 and has slidable connection with the rear plate slot 40. Each pivot pin 44 has a collar 46 detachably fixed thereto and disposed between the upper furcation and the plate 31 and which is of a diameter greater than the width of the slots 40 for supporting the upper furcations of the drag links substantially above the plate 31, as illustrated in Figure 5, for a purpose which will hereinafter become apparent.

A latch bar 47 is disposed on the plate 31 and longitudinally thereof and has one end pivotally connected to the plate 31 near the end thereof remote to the slots 40 by a pivot pin 48. The latch bar 47 has an actuating rod 49 pivotally connected to its opposite end and extending therefrom toward and beyond and end of the chassis 10. The latch bar 47, adjacent said last mentioned end is laterally enlarged as seen at 50 and is provided in its laterally enlarged portion with laterally extending transversely aligned notches which open outwardly on the side edges of said portion 50 and which includes a front notch 51 and a rear notch 52.

The axle 12 adjacent to but spaced from the ends thereof is provided with upstanding fixed enlargements forming stops 53 and 54, as best seen in Figures 1, 2 and 8, which are spaced apart a distance substantially greater than the spacing between the remote ends of the boxes 27.

A trailer tongue 55 has a bifurcated rear end, the parallel furcations 56 of which are loosely disposed between pairs of forwardly projecting ears 57 which are fixed to and extend forwardly from the front end of the chassis frame 10 and which have fastenings 58 extending therethrough and through the furcations 56 for swingably connecting the tongue 55 to the forward end of the chassis frame 10 for swinging movement in a vertical plane about a horizontal axis. The forward free end 59 of the tongue 55 is connected detachably by a coupling pin 60 to a drawbar 61 which projects rearwardly from the rear end of a draft vehicle, the rear portion of which is illustrated at 62 in Figure 8.

Assuming that the latch bar 47 is in an intermediate position as illustrated in Figure 4 so that the portion 50 thereof is disposed between the slots 40, if it is intended to pull the trailer in a forward direction or from left to right as seen in Figure 1, the draft vehicle 62 will initially move forward in a straight line so that the wheels 19 will substantially track or follow in alignment with the wheels of the draft vehicle. This will cause the wheels 19 to assume positions parallel to the frame beams 15, as illustrated in Figure 4, so that the two pins 44 will be disposed in alignment with the pins 44 thus disposed, the actuator rod 49 is then manually pulled forwardly to cause the latch bar 47 to swing counterclockwise as seen in Figure 4 from its full line position so that its front notch 51 will engage the collar 46 of the front drag link 41, as illustrated in Figure 1. If the wheels 19 are already disposed parallel to the frame beams 15, the rod 49 can be manually pulled to engage the front notch 51 with the collar 46 of link 41 and the aforedescribed initial forward movement of the trailer to bring the wheels 19 into positions parallel to the frame beams 15 is not required. With the latch bar 47 disposed as seen in Figure 1, the trailer can be pulled by the draft vehicle 62. Assuming that the draft vehicle 62 executes a right turn, the drawbar 61 will then swing relatively to the tongue 55 to its position as illustrated in Figure 1, so that a lateral pull is exerted on the forward end of the chassis frame 10 causing it to slide on the axle 12 toward the stop 54 and away from the stop 53. When this occurs, since the drag link 41 is held by the latch bar 47 against sliding movement relatively to the plate 31, a pull will be exerted on the drag link 41 by sliding movement of the plate 31 to cause said drag link to in turn exert a pull on the front connecting rod 23. The rear drag link 45 may slide freely in the rear plate slot 40, so that when a pull is exerted on the front connecting rod 23 by the front drag link 41 the two crossarms 20 and spindles 17 will thus be caused to swing clockwise, as seen in Figure 1, to cause the wheels 19 to turn to the right to follow the right turn of the draft vehicle. Thereafter, when the draft vehicle resumes a straight course, the drawbar 61 will swing counterclockwise on the coupling pin 60, as seen in Figure 1, to initially slightly past the axis of the frame 10, since the front end of the frame is offset to the right toward the stop 54. Thus a transverse pull will be initially exerted on the front end of the frame in a direction toward the left front wheel 19 to cause the frame 10 to slide on the axle 12 toward the stop 53 and back to a centered position relatively to said stops 53 and 54, as illustrated by Figure 4. When this occurs, sliding movement of the plate 31 and boxes 27 with the frame 10 relatively to the axle 12 will exert a thrust on the front drag link 41 to cause the crossarms 20 and spindles 17 to be swung counterclockwise on the journals 18 to re-align the spindles 17 and to position the wheels 19 parallel to the axis of the frame 10. Similarly, if the draft vehicle 62 executes a left turn the forward end of the frame 10, the boxes 27 and the plate 31 will slide from a centered position toward the stop 53 so that the front drag link 41 will exert a thrust against the front connecting rod 23 to swing the wheels 19 to the left to cause the trailer to execute a left turn behind the draft vehicle. When the front end of the frame 10 slides on the axle 12, the rear end of said frame pivots about a vertical axis which passes substantially through the center of the rear axle 11, due to the rear wheels swiveling or twisting on their supporting surface, in the same manner that a turn is accomplished by the rear end of a motor vehicle. It will be understood that the boxes 27 slide on the axle 12 thus permitting the lateral swinging movement of the forward end of the trailer frame 10, and that the plate 31 moves with the boxes 27 and the forward end of the frame 10. It will also be apparent that the slidably or telescopically connected standards 32 prevent any lateral movement of the forward end of the frame relatively to the boxes 27 or plate 31 to thus relieve the front springs 13 from the lateral thrust which would otherwise be imparted thereto. However, said standards 32 do not prevent the front axle 12 from moving upwardly relatively to the frame 10 or the forward end of the frame 10 from being displaced downwardly toward said axle. So long as the trailer is to be pulled forwardly the latch bar 47 remains in its position of Figure 1 and is moved from said position by manual actuation of the rod 49, only when it is desired to back the trailer. Furthermore, the latch bar 47 only assumes its inoperative, intermediate position of Figure 4 ordinarily in moving from its position of Figure 1 to its position of Figure 8 or its dotted line position of Figure 4. Ordinarily before backing the trailer, it is pulled forwardly sufficiently to cause the wheels 19 to assume positions parallel to the axis of the frame 10 so that the two pins 44 are in alignment as seen in Figure 4. A push is then exerted on the actuating rod 49 to swing the latch bar 46 clockwise on its pivot 48 from its position of Figure 1 to its dotted line position of Figure 4 or its position of Figure 8, for releasing the front drag link 41 and for latching the rear drag link 45 to the plate 31. Assuming that it is now desired to back the trailer and turn it to the left, the front steering wheels of the draft vehicle, not shown, are turned in a direction to cause the draft vehicle to initially back to the right, as illustrated in Figure 8. This will cause a thrust to be exerted against the frame 10 in a direction to swing the forward end of the frame toward the right hand stop 54 so that the frame with the plate 31 and boxes 27 will slide on the axle 12 toward the stop 54 and away from the stop 53, as illustrated in Figure 8. The movement of the plate 31 with the forward end of the frame 10 and the boxes 27 will exert a pull on the rear drag link 45 since said drag link is latched by the latch bar 47, so that the drag link will exert a pull on the rear connecting rod 24, while the front drag link 41 is free to slide in the front slot 40. Accordingly, the connecting rod 24 will cause the two crossarms 20 and spindles 17 to swing counterclockwise on the journals 18 as seen in Figure 8 for turning the steering wheels 19 of the trailer in a direction to cause the trailer to back to the left or in the opposite direction to the initial backing direction of the tractor or draft vehicle 62. After the vehicles have assumed their positions of Figure 8, the draft vehicle 62 may be backed straight to the rear and thereafter backed to the left to follow the trailer vehicle in making its left turn in backing. It will also be readily apparent that the trailing vehicle may be backed to the right with equal ease by initially turning the steering wheels of the draft vehicle to cause it to back to the left, so that the forward end of the frame 10 will be forced laterally toward the stop 53 thereby causing a thrust to be exerted on the drag link 45 and rear connecting rod 24 for swinging the steering wheels 19 in the opposite directions to their positions of Figure 8. The backing of the trailer vehicle to the right is then accomplished in the same manner as previously described in reference to the backing thereof to the left, with the draft vehicle after first backing to the left, being thereafter backed straight to the rear thence to the right to follow the backing right hand turn of the trailer.

It will also be readily apparent that the latch bar 47, drag link 45 and connecting rod 24 could be eliminated if it were desired to utilize the attachment only for steering the trailer while moving in a forward direction and in which case the slot 40 associated with the front drag link 41 could be eliminated and replaced by an opening for receiving the pivot pin 44 of the drag link 41. It will also be apparent that the steering unit may be utilized on the steering wheels of a tractor located at either end of the tractor for steering the trailer in either a forward or backward movement. It will also be readily apparent that by use of the trailer steering attachment a trailer vehicle may be readily backed in a straight path or may be readily turned in either direction as desired and which is substantially impossible with conventional trailer draft connections wherein backing of the trailer usually results in a jackknifing of the trailer and draft vehicle.

Various other modifications and changes are contemplated and may obviously be resorted to, without departing from the spirit or scope of the invention as hereinafter defined by the appended claims.

I claim as my invention:

1. A steering attachment for a trailer having steering ground wheels journaled on spindles pivoted on the ends of an axle and a chassis frame portion supported on springs and disposed above the axle, a crossarm secured to the pivoted end of each spindle and disposed at a right angle thereto, a front connecting rod pivotally connnected to forward end portions of the two crossarms remote from the spindle pivots and a rear connecting rod pivotally connected to rear end portions of the two crossarms and remote from the spindle pivots for causing the spindles and wheels to swing in unison relatively to the ends of the axle, a pair of box units slidably mounted on said axle, a plate having end portions resting on and secured to said box units and supported thereby above and spaced from the axle, said plate having longitudinally extending slots adjacent its longitudinal edges, a front drag link having one end pivotally connected to the front connecting rod and having an opposite end slidably engaged in one of said slots, a rear drag link having one end pivotally connected to the rear connecting rod, means on the opposite end of said rear drag link slidably engaged in the other slot, a latch bar disposed against one side of the plate and having one end pivotally connected thereto for swinging movement transversely of the plate, said latch bar having transversely aligned front and rear notches opening outwardly of its side edges, the ends of said plate forming supporting portions for said springs, clamping means secured to the box units and extending upwardly therefrom and disposed above said plate ends and said springs for securing said springs to said plate ends, said latch bar being swingable in one direction for engaging its front notch with the slidable means on the front drag link and for positioning the latch bar out of engagement with the slidable means on the rear drag link whereby a lateral pull on the chassis frame portion disposed adjacent said axle will cause said frame end, the plate and box units to slide toward one end of the axle for exerting a pull or thrust on the front drag link for turning the steering ground wheels in a direction corresponding to the direction of pull exerted on said frame end, said means on the rear drag link sliding in the slot engaged thereby relatively to the plate toward one or the other end of the plate and moving in a direction opposite to the direction of movement of the plate.

2. A steering unit as in claim 1, said latch bar being swingable in the other direction to disengage the latch bar from the slidable means on the front drag link and for engaging the rear notch of the latch bar with the slidable means on the rear drag link whereby a lateral thrust exerted on an end of the frame located adjacent the steering unit will cause the frame to move laterally of the axis of the vehicle and in unison with the box units and plate toward one end of said axle for exerting a pull or thrust on the rear drag link for swinging the steerable wheels in an opposite direction to swinging movement of the wheels actuated by the front drag link by sliding movement of the plate in the same direction, said slidable means on the front drag link sliding relatively to the plate and the plate slot engaged thereby and in the opposite direction to sliding movement of the plate, said axle having stops fixed thereto spaced equal distances from the pivots of the spindles and disposed beyond said box units and engaged by the box units for limiting lateral movement of the box units, plate and frame relatively to the axis of the trailer.

3. A trailer steering unit as in claim 2, and standards formed of telescopic sections connecting the ends of the plate and portions of the frame disposed thereabove, each including an upper section fixed to the chassis frame portion and a lower section fixed to an end of the plate, said standards preventing movement of the frame transversely to the axis of the trailer relatively to the plate and box units.

4. A steering unit for a trailer having steering ground wheels journaled on spindles pivoted on the ends of an axle and a chassis portion disposed above the axle, comprising a crossarm secured to each spindle adjacent the pivot thereof and disposed at a right angle thereto, a front connecting rod pivotally connected to forward ends of the crossarms remote from the spindle pivots, a rear connecting rod pivotally connected to the rear ends of said crossarms remote from the spindle pivots for causing the wheel spindles to swing in unison, a slide unit interposed between said chassis portion and the axle and reciprocably mounted on the axle, front and rear drag links having corresponding ends slidably connected to said slide unit for sliding movement longitudinally thereof and of the axle, said front and rear drag links having opposite ends pivotally connected to corresponding portions of said front and rear connecting rods, said slide unit being secured to said chassis portion for movement therewith toward either end of the axle, a latch bar having one end swingably connected to a portion of the slide unit and having notches adjacent its opposite end and on opposite sides thereof for receiving and engaging the slidable end of either of said drag links for latching either drag link to the slide unit for movement therewith relative to the axle whereby a lateral pull or thrust on an end of the chassis located adjacent said slide unit causes movement of the slide unit and said chassis portion toward either end of the axle for swingably moving said steerable wheels, said steerable wheels being swung in one direction by movement of the slide unit toward one end of the axle when the slidable end of the front drag link is latched to the slide unit and in the opposite direction when the slidable end of the rear drag link is latched to the slide unit by said latch bar.

5. A steering attachment as in claim 4, an actuating rod connected to said opposite end of said latch bar and extending beyond an adjacent end of the chassis frame, said actuating rod being adapted to be manually actuated for selectively engaging the latch bar with the slidable end of either drag link.

References Cited in the file of this patent

UNITED STATES PATENTS

| | | |
|---|---|---|
| 656,491 | Valentine | Aug. 21, 1900 |
| 1,638,953 | Oppenheim et al. | Aug. 16, 1927 |
| 1,697,285 | Neighbour | Jan. 1, 1929 |
| 1,756,239 | Chojnacki et al. | Apr. 29, 1930 |
| 1,951,147 | Greist | Mar. 13, 1934 |
| 2,411,570 | Hawkins | Nov. 26, 1946 |
| 2,545,119 | Stratton et al. | Mar. 13, 1951 |

FOREIGN PATENTS

| | | |
|---|---|---|
| 340,253 | Great Britain | Dec. 23, 1930 |